US011959598B2

(12) United States Patent
Athalye

(10) Patent No.: US 11,959,598 B2
(45) Date of Patent: Apr. 16, 2024

(54) CEILING ILLUMINATION

(71) Applicant: Praneet Jayant Athalye, Apex, NC (US)

(72) Inventor: Praneet Jayant Athalye, Apex, NC (US)

(73) Assignee: BUCK BOOST, LLC, Apex, NC (US)

( * ) Notice: Subject to any disclaimer, the term of this patent is extended or adjusted under 35 U.S.C. 154(b) by 0 days.

(21) Appl. No.: 17/109,123

(22) Filed: Dec. 1, 2020

(65) Prior Publication Data

US 2021/0156522 A1 May 27, 2021

Related U.S. Application Data

(63) Continuation of application No. 15/860,629, filed on Jan. 2, 2018, now Pat. No. 10,851,949.

(51) Int. Cl.

| | |
|---|---|
| ***F21V 7/00*** | (2006.01) |
| ***F21K 9/232*** | (2016.01) |
| ***F21V 19/00*** | (2006.01) |
| ***F21V 29/83*** | (2015.01) |
| *F21K 9/68* | (2016.01) |
| *F21V 23/06* | (2006.01) |
| *F21Y 107/60* | (2016.01) |
| *F21Y 115/10* | (2016.01) |

(52) U.S. Cl.

CPC ............ *F21K 9/232* (2016.08); *F21V 19/003* (2013.01); *F21V 29/83* (2015.01); *F21K 9/68* (2016.08); *F21V 23/06* (2013.01); *F21Y 2107/60* (2016.08); *F21Y 2115/10* (2016.08)

(58) Field of Classification Search

CPC ............................ F21V 7/0008; F21V 21/008; F21S 8/04–068; F21Y 2103/33; F21Y 2105/18

See application file for complete search history.

(56) References Cited

U.S. PATENT DOCUMENTS

| | | | | |
|---|---|---|---|---|
| 7,722,220 B2 * | 5/2010 | Van De Ven | ............. | F21V 7/26 362/294 |
| 8,454,204 B1 | 6/2013 | Chang | | |
| 8,632,206 B2 | 1/2014 | Chung | | |
| 2009/0290343 A1 | 11/2009 | Brown | | |
| 2011/0235318 A1 * | 9/2011 | Simon | ..................... | F21K 9/275 362/225 |
| 2013/0058075 A1 * | 3/2013 | Wang | ...................... | F21S 8/063 362/147 |

(Continued)

OTHER PUBLICATIONS

Seo et al., "Investigation of wireless power transfer in through-wall applications," 2012 Asia Pacific Microwave Conference Proceedings, Kaohsiung, Taiwan, 2012, pp. 403-405, doi: 10.1109/APMC.2012.6421612.

(Continued)

*Primary Examiner* — Sean P Gramling

(57) ABSTRACT

Ceiling illumination is a method by which indirect lighting can be achieved in a space to replace a recessed downlight and to provide better light utilization and application efficiency. A solid-state lighting apparatus is invented which includes a support structure and a substrate for mounting LEDs and configured to emit light in a direction such that, when installed as per the invented method, can illuminate a ceiling and subsequently the space below it.

20 Claims, 10 Drawing Sheets

(56) References Cited

U.S. PATENT DOCUMENTS

| | | | | |
|---|---|---|---|---|
| 2016/0134127 A1* | 5/2016 | Yang | H02J 50/10 | 307/104 |
| 2016/0146406 A1* | 5/2016 | Bobel | F21V 29/83 | 362/294 |

OTHER PUBLICATIONS https://v1.element-lighting.com/Products/Details/Reflections-Remodel-Decorative-Recessed-Downlights.

https://www.lightology.com/img/prod/pdf/element_fleur_install_040419.pdf.

Reflections: https://www.visualcomfort.com/architectural/recessed/.

https://v1.element-lighting.com/Products/Details/Reflections-Decorative-Recessed-Downlights.

* cited by examiner

PRIOR ART

CEILING ILLUMINATION

RELATED APPLICATIONS

This application is a continuation application of the U.S. patent application Ser. No. 15/860,629 filed on Jan. 2, 2018 which claims priority under 35 U.S.C § 119 to U.S. Provisional Applications 62/440,830 and 62/441,161 both filed on Dec. 30, 2016. The entire teachings of the above applications are incorporated herein by reference.

FIELD OF THE INVENTION

The present invention relates generally to SSL (solid-state lighting) fixtures and devices, particularly, to LED (Light Emitting Diode) bulbs and fixtures.

BACKGROUND

SSL fixtures refer to lighting fixtures that generate light using LEDs or other solid-state light emitters such as OLEDs (Organic Light Emitting Diodes) and laser diodes. There is a growing interest in the use of SSL fixtures, lamps, bulbs, tubes and devices for a wide variety of applications due to their high energy efficiency as compared to traditional incandescent and fluorescent lighting. LED fixtures and bulbs commercially available now exhibit very high efficiency levels (75-150 lumens per watt), excellent color rendering properties, and lifetimes from 10-100,000 hours.

SSL fixtures include an integrated or external power conversion circuit (driver) that converts ac (alternating current) or dc (direct current) input power into a dc power suitable to drive the LEDs. LEDs also generate heat and so does the driver. Excessive operating temperatures can significantly reduce the lifetime of the SSL fixture and bulky and costly metal heat sinks are mostly employed to dissipate the heat. Further, the thermal coupling (proximity) of the LEDs and driver is not conducive for the reliability of either. As of this writing, a popular fixture to illuminate an indoor space is a recessed downlight which sits in a ceiling plenum space.

Lighting is classified as direct, indirect or direct-indirect. A recessed downlight is an example of direct lighting. Two major challenges exist for a common recessed downlight installation. First is the poor light utilization and the second is the user experience. FIG. 3, prior art, shows an example of such a downlight installation. Note that the reference numerals of FIG. 3 are limited to FIG. 3 alone, as they are a part of a prior art patent drawing, and do not indicate like elements elsewhere in this specification. Further referring to FIG. 3, the lens (54) is recessed and the LEDs are further recessed (at 32) to reduce the glare, and hence the light extraction efficiency is poor. Further, as the light is cast with a strong center beam power, most of it hits a floor and is wasted because a typical floor reflectance is only 20% (whereas a white ceiling is 80-90%). Further, the source light color is significantly altered by the floor's spectral reflectance. Hence the whole room is poorly lit and feels cave-like. Overall, the application efficiency is poor. Other problems for the recessed fixture include a harsher operating (thermal) environment (10) for the driver (30) above the ceiling (42), an expensive and bulky heat sink (32), potential to leak room-side conditioned air despite the trim (56), and restricted wireless radio-frequency (RF) control capability for connected lighting as it is situated inside a metal can (26).

Maximizing light utilization for both LED and OLED sources will require a move beyond legacy form factors such as the light bulb and the recessed luminaire, toward form factors that maximize application efficiency as well as optical, electrical, and thermal efficiency. Hence, a novel system with a unique form factor is needed to overcome the challenges and increase the application efficiency and maximize light utilization.

DETAILED DESCRIPTION

Embodiments of the present inventive subject matter now will be described more fully hereinafter with reference to the accompanying drawings, in which embodiments of the present inventive subject matter are shown. This present inventive subject matter may, however, be embodied in many different forms and should not be construed as limited to the embodiments set forth herein. Rather, these embodiments are provided so that this disclosure will be thorough and complete and will fully convey the scope of the present inventive subject matter to a person of (ordinary) skill in the art (POSITA). Like numbers refer to like elements throughout except as otherwise indicated.

The expression "lighting apparatus," "illuminating device," or "light engine" as used herein, is not limited, except that it indicates that the device is capable of emitting light. That is, a lighting apparatus can be a device which illuminates an area or volume, e.g., a structure, a swimming pool or spa, a room, a warehouse, an indicator, a road, a parking lot, a vehicle, signage, e.g., road signs, a billboard, a ship, a toy, a mirror, a vessel, an electronic device, a boat, an aircraft, a stadium, a computer, a remote audio device, a remote video device, a cell phone, a tree, a window, an LCD display, a cave, a tunnel, a yard, a lamppost, or a device or array of devices that illuminate an enclosure, or a device that is used for edge or back-lighting (e.g., back light poster, signage, LCD displays), bulb replacements (e.g., for replacing ac incandescent lights, low voltage lights, fluorescent lights, tube light, etc.), lights used for outdoor lighting, lights used for security lighting, lights used for exterior residential lighting (wall mounts, post/column mounts), ceiling fixtures/wall sconces, under cabinet lighting, lamps (floor and/or table and/or desk), landscape lighting, track lighting, task lighting, specialty lighting, ceiling fan lighting, archival/art display lighting, high vibration/impact lighting, work lights, etc., mirrors/vanity lighting, or any other light emitting device.

According to the invention, a solid-state lighting apparatus is installed in a space in close proximity of its ceiling. In some embodiments, the apparatus may fit within 1 to 10 inches from the ceiling. Substantially all the light emanating from the apparatus is directed towards the ceiling, which, in some embodiments, can create an appearance of a recessed downlight without the disadvantages of the same described earlier. The invented method ensures that majority portion of the light directed towards the ceiling is reflected back towards the space.

Figure 1:
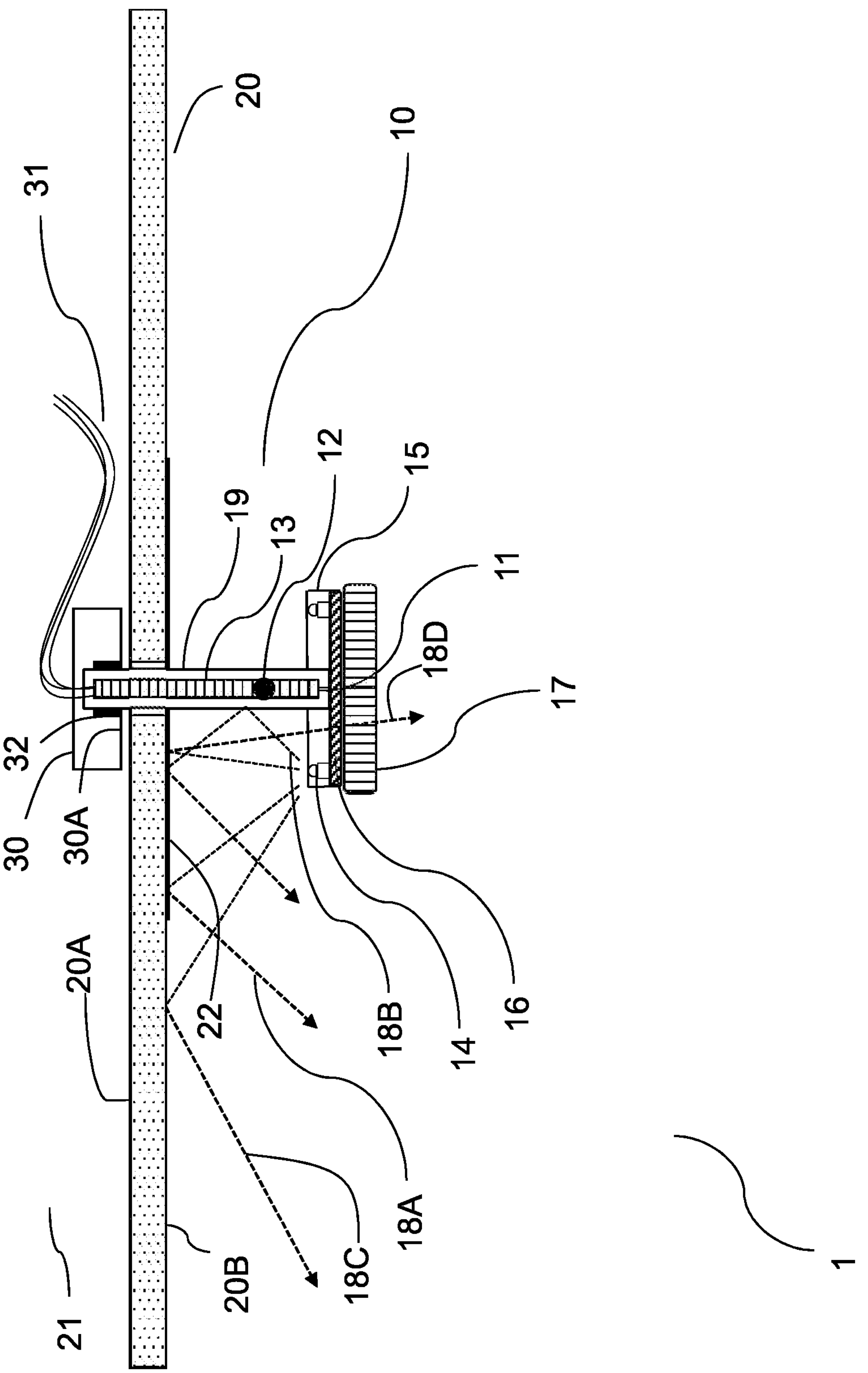
FIG. 1 is a cross section of a novel ceiling illumination system.

FIG. 1 shows a cross-section of a ceiling illumination system 1 which comprises a ceiling or a ceiling portion 20, a solid-state lighting apparatus 10, and a junction box 30. The ceiling 20 may be a drywall as found in the US residential construction. The ceiling may be a dropped ceiling as found in the US commercial buildings. The ceiling may be an acoustical ceiling tile made of fiber or other material. The ceiling tile may be of metal or wood. The ceiling tile may be of approximate dimensions of 2'×2' or 2'×4' or similar. The ceiling may have a plenum space 21 above it. The ceiling may be made of concrete slab. The ceiling 20 has a core of a certain thickness, a top surface 20A and a bottom surface 20B. In some embodiments the ceiling thickness may be approximately 0.1 to 2 inches. The bottom surface 20B may also be referred to as the room-side surface or ceiling in colloquial terms. This surface is usually of white or similar light color for high reflectivity or diffusivity so that the room or space below can be sufficiently illuminated with natural light coming in from windows or other apertures of the room or artificial ambient light. In some embodiments the ceiling may be painted in standard white color or a bright white i.e. SW7007 from Sherwin-Williams®. In some embodiments the paint may be >80% reflective. The ceiling may be enhanced with a special coating, sticker, in-lay, cover, imprint or material represented by 22. The surface of 22 may be textured or engineered to have a specific light reflection and diffusion properties or patterns. 22 may assume different shapes such as circular or rectangular. In certain embodiments, 22 can have a diameter between 1 to 20 inches. Further, 22 can have various thicknesses. Thinner enhancements would be less noticeable whereas thicker enhancements may cast shadows which may be an architectural feature of the system. In certain embodiments, the thickness of 22 may be 1 mm or less. In certain embodiments the thickness of 22 may be 10 mm or less. In some embodiments 22 may be a highly diffusive sheet of standard WhiteOptics® material. In certain embodiments, 22 may be a plastic disc or a metal cover of the junction box 30. The purpose of 22 is to reflect a majority of the light 18A, 18B and 18D shining on to it down towards the room side. The light spillage may be represented by 18C and may still reflect from the surface 20B effectively. The light rays represented by 18$x$ (18A . . . 18D) are a mere representation and do not construe the only light emitted by the LED(s) 14. Furthermore, light similar to 18$x$ is emitted by the other LEDs on the LED PCB. Light reflection is categorized in three ways: specular, diffuse and spread and a combination of these types can be embodied in the reflective surface 20B and/or 22. In certain embodiments, >80% of the total light emitted by the LEDs 14 would be incident on 22. In the absence of 22, in certain embodiments, >50 to 80% of the light may be incident on 20B within a circular shape with a diameter of 1 to 12 inches. According to some embodiments, 22 or 20B may be coated with pigments that alter the spectral reflectance, which means that the some wavelengths in the incident light are suppressed or absorbed more than the other wavelengths.

The junction box 30 in FIG. 1 is shown to be situated above the ceiling 20. It is well known in the art to have an opening in the ceiling that is slightly larger than the junction box so that the bottom edge 30A of the junction box can be positioned within the boundaries of 20A and 20B of the ceiling. In the present invention, the ceiling penetration is minimized by situating the junction box above the ceiling. For example, a traditional junction box may require an opening of approximately 4 inch×4 inch while in our embodiment the ceiling opening may be a circle of diameter of less than one inch. Electric power, ac or dc, may first enter the junction box via cables 31. Typically, 31 comprises line (black), neutral (white) and ground (bare copper) wires and in some cases a switched line (red) for a 3-way switched fixture for the standard US electrical wiring. The wires 31 may be terminated in a novel way directly on the lighting apparatus 10 as shown in our embodiment or to a set of wire nuts or electrical connectors situated inside the junction box, as well known in the art. In some embodiments, a junction box may not be present and the wires are safely terminated inside the apparatus 10. An example of such an embodiment is with a Power-over-Ethernet (POE) system where a CAT-5 or equivalent cable can be directly plugged into the apparatus 10. Further, the apparatus 10 may be connected to the junction box 30 or to the ceiling 20 (in the absence of a junction box) with screws, friction fit, magnetic fit, threaded mechanism such as an Edison base, a twist mechanism such as a GU base or alike as represented by 32 which can be easily understood by a POSITA.

The lighting apparatus 10 of FIG. 1 comprises a support structure 19 also serving as the enclosure or the driver housing. It further comprises one or more printed circuit boards (PCB) 13 with one or more electronic components 12 mounted thereupon. Additionally, it comprises an LED PCB 16 configured to mount one or more LEDs 14. The LED PCB may be surrounded by an enclosure (not shown) for aesthetic structural reasons as well known in the industrial design world. Furthermore, the LED PCB may be attached to a heat sink, fan, or other heat dissipating device 17. The driver PCB and the LED PCB are connected with electrical connections 11. A baffle 15 may be present to block the light directly emanating from the LEDs from going below the horizontal plane, described further in the application, of the LED PCB. The apparatus is primarily installed such that the majority of the light is directed towards the ceiling 20 and reflected or diffused off of the ceiling and then distributed throughout the space being illuminated below the ceiling. Each of the subparts of the apparatus 10 will be described in details ahead.

The support structure 19 may be made of a combination of plastic, ceramic, glass, metal or metal over-molded with an insulating material. The structure may make contact with the heat sink 17 and/or assist with conducting heat away from the LED PCB. The outer surface of the structure exposed to the room side, which is the space below the ceiling 20, may be of highly reflective or diffusive properties to reflect the light shown by 18B. In certain embodiments the length of 19 may be less than two to six inches, while in other embodiments according to the invention the length can be user-configurable. In certain embodiments the diameter of the structure may be less than one to four inches. In certain embodiments, the shape of the structure may be a tube or may be non-cylindrical such as triangular, rectangular or polygonal. In certain embodiments, the angle of the structure relative to the ceiling plane or the LED PCB plane may be other than 90°. In some embodiments, the structure may have different cross-sections along the length, i.e. it may be broader at the top and narrower at the bottom and so on. According to this invention, the support structure may a include a connector to which wires 31 will be terminated to supply the input power.

In some embodiments 32 may be a powered or motorized mechanism which can raise or lower the tube 19, in the absence of 30 or in the presence of an appropriately sized junction box 30. The distance of the LED PCB 16 from 20 may determine the area of the hot spot of light on the surface 20B or 22. The mechanism 32 may be controlled such that the entire apparatus 10 may be raised up through an appropriately sized opening in 20 and may disappear from view, from the room side, except for its bottommost surface which may be flush with 20B. This position may be called a parked position which is not usable for illumination. An appropriately sized disc 22 may move up and down with the apparatus such that the disc is flush with 20B in the usable position.

An LED driver is a power supply that converts its input ac or dc power into a suitable form, typically a constant dc current, to drive the LEDs. The driver circuit, composed of one or more electronic components (see FIG. 9), represented by 12 for clarity, may be completely incorporated on the PCB 13. In some embodiments some of the driver circuitry may be on the LED PCB 16. In a certain embodiment, all of the driver circuitry resides inside the upper section of 19 in the confines of 30 so that the lower section of 19 can be as narrow as possible. Further, according to some embodiments, all of the power supply may be mounted on the PCB 16 and the PCB 13 may be absent in which case the wires 11 will be connected to wires 31. The driver circuit may generally step up or step down the input voltage or a combination thereof. In some embodiments, the driver circuit may be based on a boost converter with an output voltage greater than 200 V. In some embodiments the LED voltage may be greater than 250 V. In some embodiments the driver may be based on buck, boost, buck-boost or LLC topology. The LED driver output may be single or multi-channel to drive single or multiple LED strings with LEDs of different colors such as warm white and cool white or red and blue. The LED current may be tightly regulated, loosely regulated or unregulated.

The LED PCB or substrate 16 as the name suggests is primarily for mounting LEDs. The shape of this PCB may be circular, rectangular or polygonal. According to some embodiments of the invention, the PCB 16 may be of annulus or ring shaped with a diametrical support member with apertures to let the reflected light 18D pass through. Another identifier for such a shape is the general "prohibition sign" symbol. In some embodiments there may be two or more such apertures. In some embodiments, the bottom view of the apparatus may resemble the three-pointed star of the emblem of Mercedes-Benz®. The LED substrate and the LEDs may be positioned aligned with the same central axis as the support structure so as not to cast asymmetrical shadows on the ceiling.

The LEDs 14 are mounted on the LED PCB 16. According to one embodiment, LED 14 comprises a base represented by a rectangular box and a primary optic represented by a dome shaped geometry. In some embodiments such as FIG. 4 the primary LED optic is cubical. In certain embodiments, the primary optic may be shaped in an asymmetric way to engineer the light distribution (18A, 18B, 18C) for optimized light utilization and application efficiency. For example, more light may be emitted in the direction of 18A and 18C than 18B. In other embodiments according to this invention, light distribution in the direction of 18C may be minimized or maximized relative to 18A and 18B. LEDs 14 may be medium-power LEDs in a package such as "2835" or a high-brightness LED or a flip-chip LED or a chip-on-board (COB) or a filament LED. In certain embodiments the LED may be a blue LED with remote phosphor. In certain embodiments the LEDs may be ultra-violet (UV) LEDs. The LED viewing angle is simply a measure of the position where the intensity of the LED light spread reaches 50% of its maximum brightness. In some embodiments, the LED viewing angle may be 120° while in other embodiments it may be between 60 to 170°. The LEDs may be arranged symmetrically around a central axis.

According to some embodiments, a reflective or diffusive baffle 15 may be inserted around the LED PCB 16 so that the light emitted from the LEDs is blocked from directly going below the horizontal plane of 16. In other words, the majority of the light going below the horizontal plane may be indirect light. In certain embodiments, substantially all the light emitted by the LEDs is incident on the ceiling directly or indirectly. In some embodiments the baffle is perpendicular to the PCB 16 while in other embodiments, the baffle may be conical, hemispherical, pyramidal or any other shape to optimize the light distribution. The baffle may be made of flexible material which can be configured in the field during installation to attain a desired light distribution. Although not shown in the figures except for FIG. 11, for clarity, the baffle may be on either side of the LEDs. In some embodiments, the baffle may be finned to serve the purpose of a heat sink. In such embodiments, vertical fins may be directed radially outward from the central axis of the support 19 and the heat sink 17 may be absent.

Figure 2:
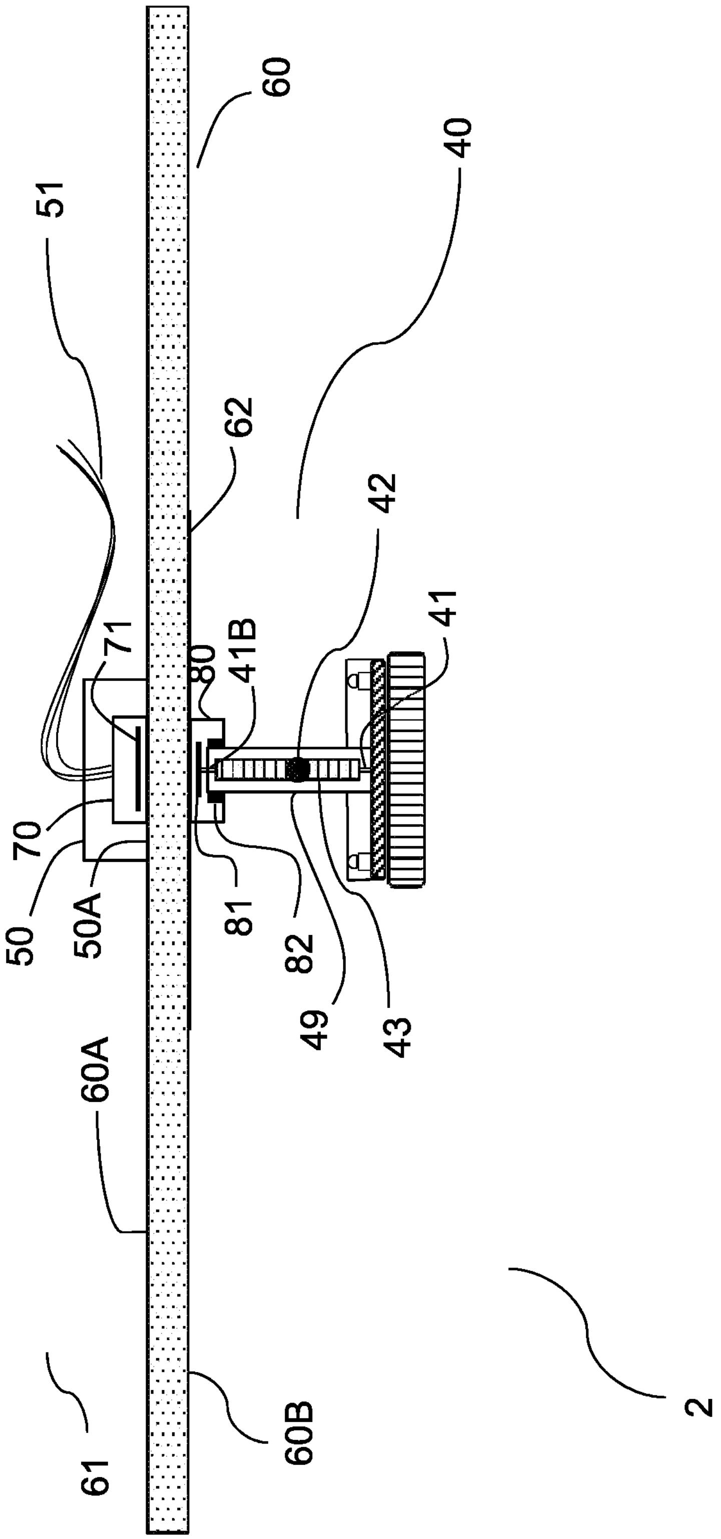
FIG. 2 is a cross section of another embodiment of the novel system with wireless power transfer.
Figure 3:
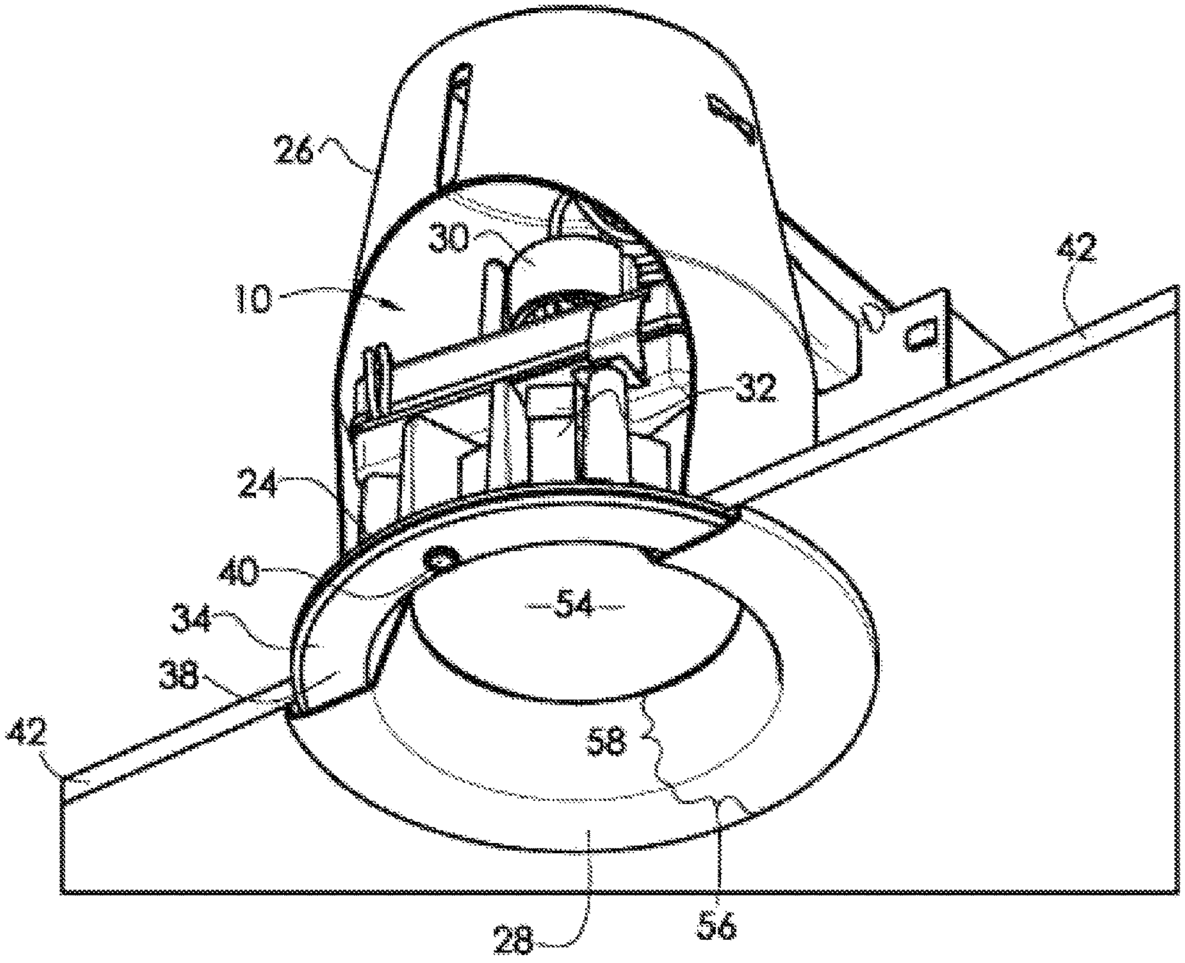
FIG. 3 is an enhanced drawing of a prior art.

FIG. 2 represents an embodiment according to this invention of a solid-state lighting system 2. Several elements of FIG. 2 are similar to the embodiment 1 of FIG. 1. The similar elements, which will not be described separately for brevity, are as follows: 60~20, 60A~20A, 60B~20B, 61~21, 62~22, 50~30, 50A~30A, 51~31, 41~11, 42~12, 43~13, 49~19 and 82~32, where ~ represents similarity. The lighting apparatus for FIG. 2 is represented by 40 which is similar to 10 in the sense of the LEDs 14, LED PCB 16, baffle 15 and heat sink 17 while it differs in where it is connected and how it receives power. Although not shown for simplicity, further similarity between FIG. 2 and FIG. 1 is regarding the light distribution from the LEDs.

According to this invention, power may be wirelessly transferred across the ceiling via a transmitting coil 71 to a receiving coil 81. The receiving coil or receiver 81 may be housed in an enclosure 80 which also serves to support 49 with the mechanism 82. The electrical connections between 81 and the driver PCB 43 are represented by 41B. The transmitting coil or the transmitter may be housed in an enclosure 70 that may be situated in a junction box 50. Additional electronics circuitry that interfaces with the coils may be situated in the enclosures 70 and 80. An example of a wireless power transfer system is a technology by a company called ChargEdge in California. One embodiment of the system may be "Qi," which is an open interface standard that defines wireless power transfer using inductive charging over distances of up to 4 cm (1.6 inches), developed by the Wireless Power Consortium.

The enclosure 80 may be attached to the ceiling 60 by methods such as gluing, removable adhesives, nails, screws or magnetic attraction. The junction box 50 may be portable in the sense that it may be relocated depending on the layout of the room and as such the enclosure 80 could be relocated along with the apparatus 40.

According to FIG. 1, in some embodiments according to the invention, the PCBs can be standard FR-4 PCB. The PCB can be formed of many different materials that can be arranged to provide the desired electrical isolation and high thermal conductivity. In some embodiments, the PCB can at least partially comprise a dielectric to provide the desired electrical isolation. In other embodiments according to the invention, the PCB can comprise ceramic such as alumina, aluminum nitride, silicon carbide, or a polymeric material such as polyimide and polyester etc.

In some embodiments the PCB 16 can have a core made of transparent glass. In some embodiments, the PCB can be optically opaque while in some embodiments it can be optically translucent or diffusive. In some embodiments according to the invention, the PCB can comprise highly reflective material, such as reflective ceramic or metal layers like silver, to enhance light extraction from the SSL component.

For PCBs 13 or 16 made of materials such as polyimides and polyesters, the boards can be flexible (sometimes referred to as flexible PCBs). This can allow the board to take a non-planar or curved shape, with the LED chips also being arranged in a non-planar manner. In some embodiments according to the invention, the board can be a flexible printed substrate such as a Kapton® polyimide available from Dupont. This can assist in providing boards that emit the different light patterns, with the non-planar shape allowing for a less directional emission pattern. In some embodiments according to the invention, this arrangement can allow for more omnidirectional emission, such as in the 0-180° emission angles.

In some embodiments, the boards 13 and 16 can include dielectric layers to provide electrical isolation in top direction, bottom direction or both. The dielectric layer may comprise electrically neutral materials that provide good thermal conductivity. Different dielectric materials can be used for the dielectric layer including epoxy based dielectrics, with different electrically neutral, thermally conductive materials dispersed within it. Many different materials can be used, including but not limited to alumina, aluminum nitride (AlN) boron nitride, diamond, etc. Different dielectric layers according to the present invention can provide different levels of electrical isolation with some embodiments providing electrical isolation to breakdown in the range of 100 to 5000 volts. In some embodiments, the dielectric layer can provide electrical isolation in the range of 1000 to 3000 volts. In other embodiments, the dielectric layer can provide electrical isolation of approximately 2000 volts breakdown. In some embodiments according to the invention, the dielectric layer can provide different levels of thermal conductivity, with some having a thermal conductivity in the range of 1-40 W/m-K. In some embodiments, the dielectric layer can have a thermal conductivity greater than 10 W/m-K. In still other embodiments, the dielectric layer can have a thermal conductivity of approximately 3.5 W/m-K.

In some embodiments according to the invention, the PCB 16 can be a metal core PCB (MCPCB), such as a "Thermal-Clad" (T-Clad) insulated substrate material, available from The Bergquist Company of Chanhassen, Minn. The T-Clad substrate may reduce thermal impedance and conduct heat more efficiently than standard FR-4 circuit boards.

The sizes of the PCB 16 and the driver PCB 13 can vary depending on different factors, such as the size and number of the LEDs mounted thereon and the power rating as well as other features of the driver circuitry.

The electrical connections 31 and 11 in addition to delivering one or more forms of power may deliver to or receive signals from the boards 13 or 16. Different types of signals could include sensor feedback such as temperature, ambient light, occupancy or proximity or communication signals such as on/off or dimming control or audio in analog or digital form. The driver circuitry may be understood to perform, in addition to power processing, smart functions such as wireless communication, controls, sensing and metering.

In some embodiments according to the invention, 17 may be air movement device. In other embodiments, 17 may represent a sensor module that incorporates one or more sensors to sense or capture light, temperature, humidity, gases, airflow, sound, smells, smoke, heat, vibrations, radiation, electromagnetic signals etc.

Figure 4:
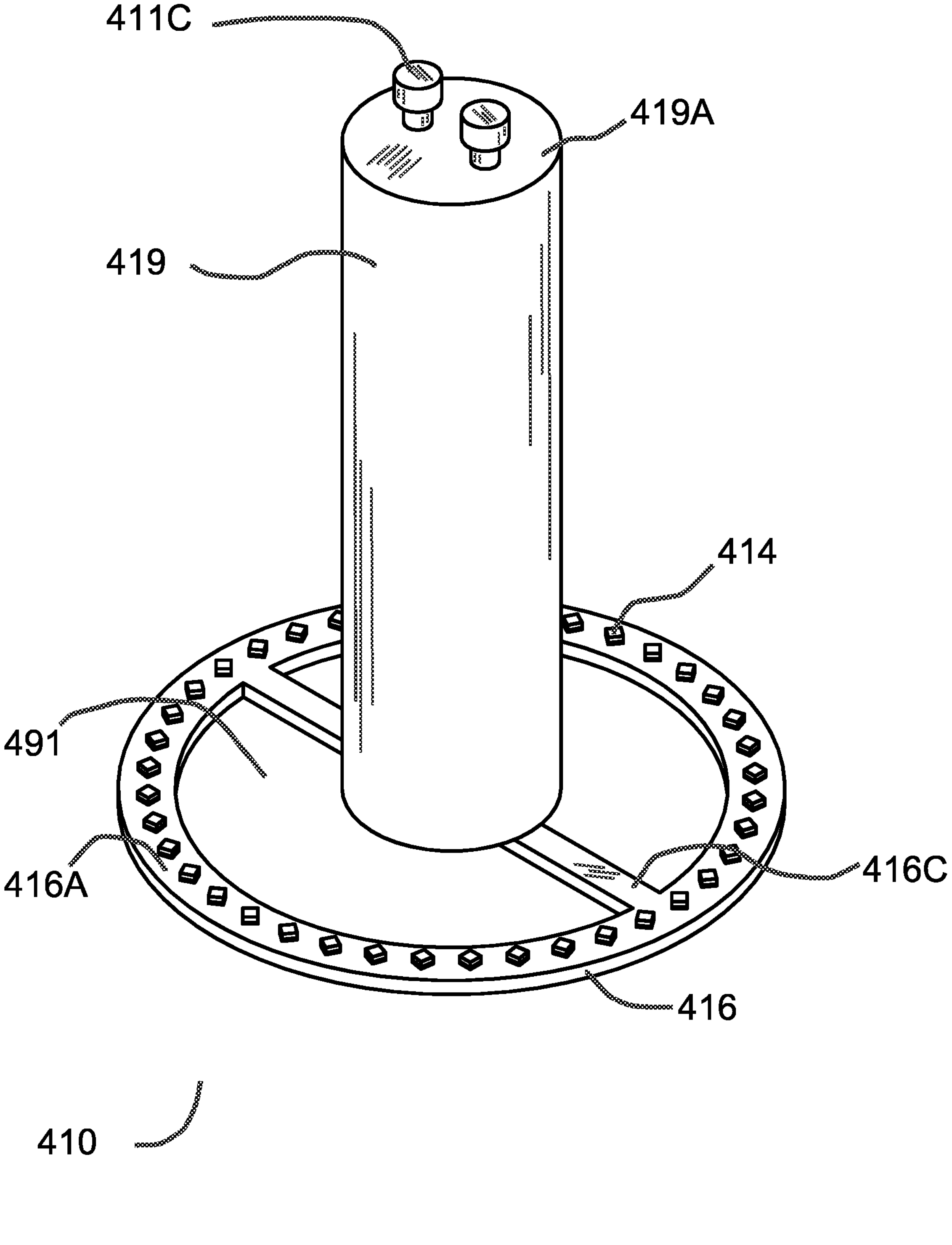
FIG. 4 is an isometric view of an embodiment of a novel lighting apparatus.
Figure 11:
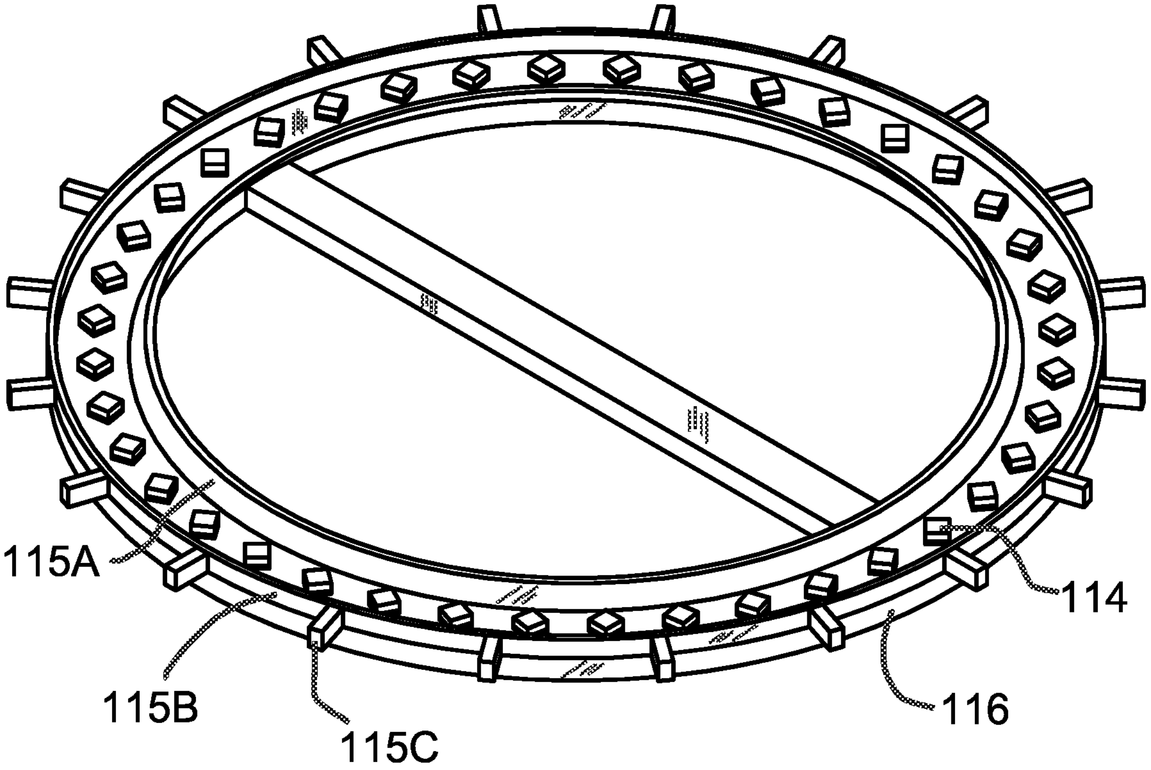
FIG. 11 is an embodiment of the LED substrate of FIG. 4 showing two embodiments of baffles.

FIG. 4 shows another embodiment 410 of the invention preserving the core teaching of the indirect lighting system. For clarity, the baffle 15 and heat sink 17 shown in FIG. 1 is not shown here however it is shown in FIG. 11 only. Alternative embodiments can be well imagined and implemented by a POSITA. The support structure 419 takes a cylindrical shape with GU10 connectors represented by 411C for supplying the electrical power. The top surface of the tubular structure is 419A. In some embodiments, ceiling 20 may incorporate an embedded female receptacle of GU10 whereby when the apparatus 410 is plugged into the receptacle, 419A is approximately flush with the bottom surface 20A of the ceiling. The LED PCB or substrate 416 is supported by 419 and has novel feature of 491 which is called an aperture which lets the reflected light from the ceiling pass through. There may be more than one apertures. The substrate 416 has a top surface shown by 416A and a connecting arm shown by 416C.

It will be pointed out that despite the large apertures, the human accessible portion of the boards or connections may be made safe to touch according to the stringent requirements of product safety agencies such as Underwriters Laboratories, by having insulating (dielectric) material layers on the substrate and connector assemblies.

Figure 5:
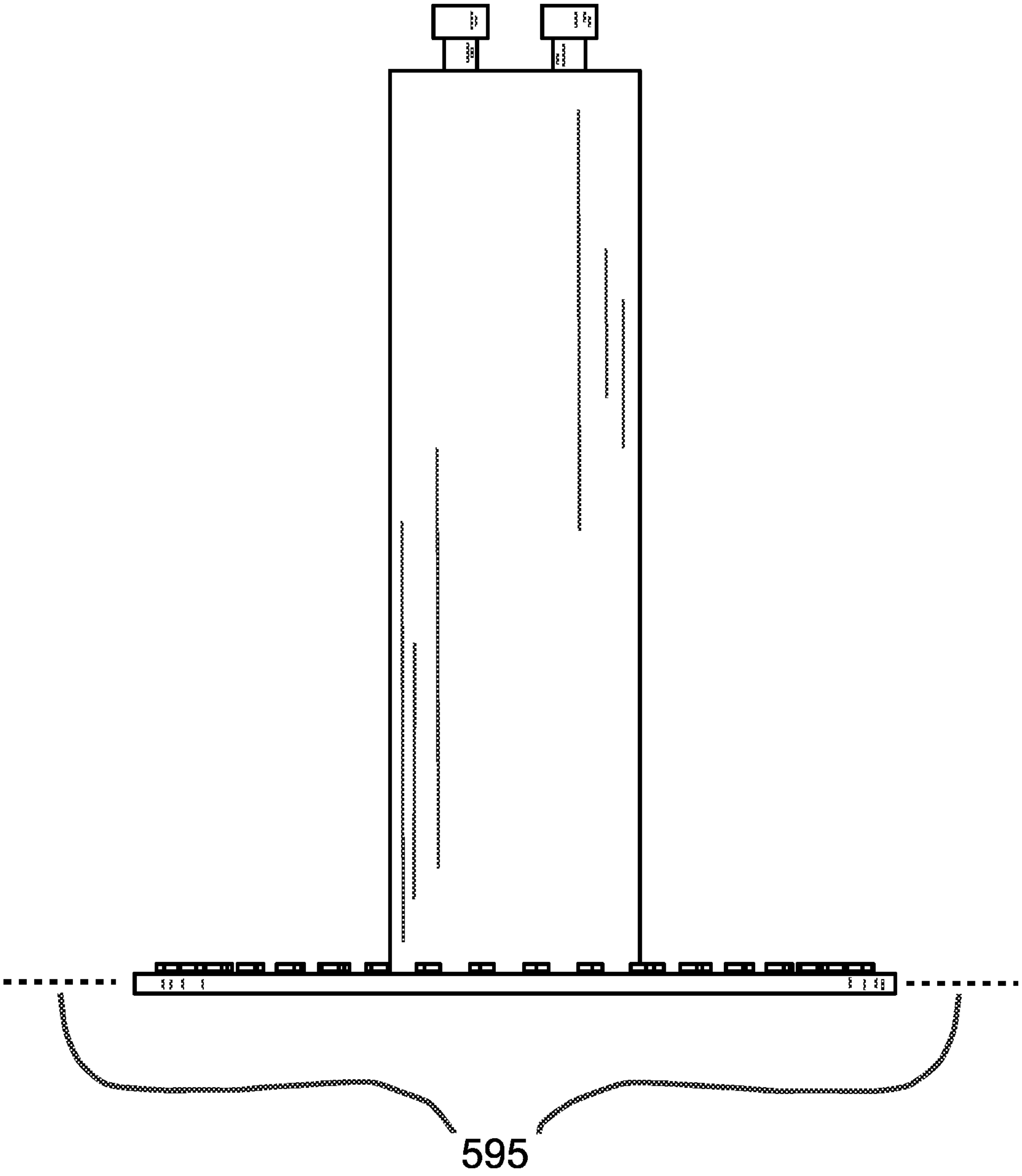
FIG. 5 is a side view of the embodiment of FIG. 4.
Figure 6:
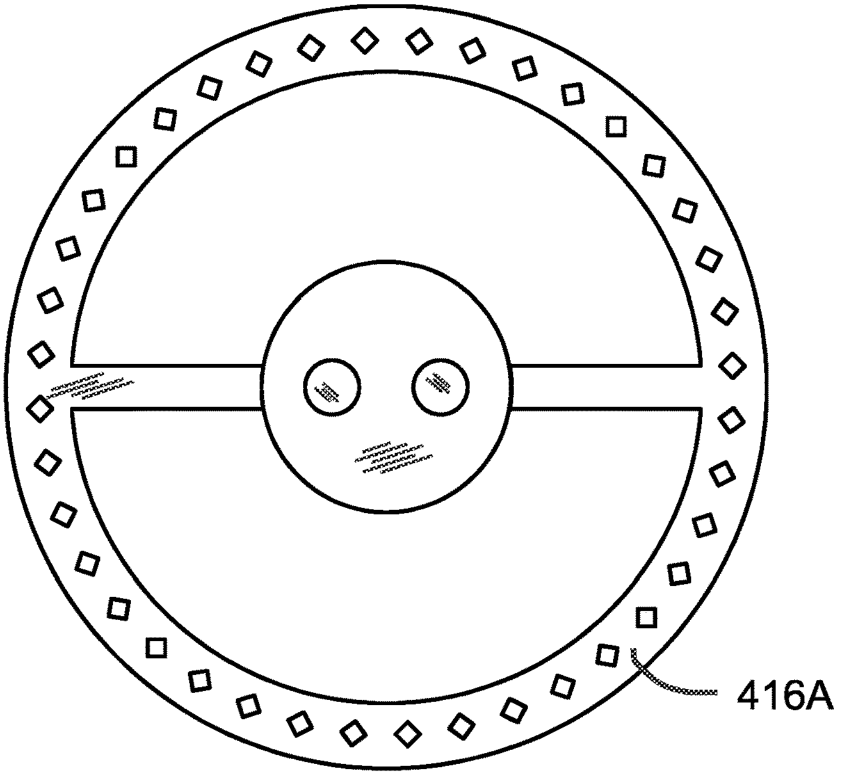
FIG. 6 is a top view of the embodiment of FIG. 4.
Figure 7:
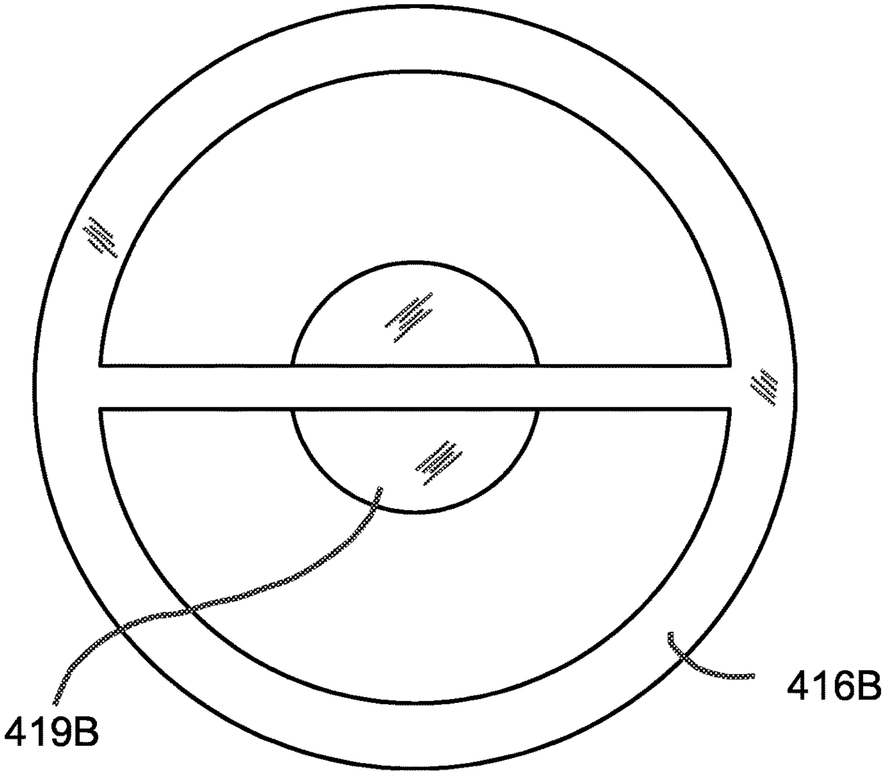
FIG. 7 is a bottom view of the embodiment of FIG. 4.

FIG. 5 represents a side view of the embodiment of FIG. 4 which shows the horizontal plane 595 of the LED substrate. The central axis of the apparatus is perpendicular to 595 and coaxial to the support structure according to some embodiments. FIG. 6 and FIG. 7 represent the top and bottom views respectively of the embodiment of FIG. 4. 416A represents the top surface of the PCB 416 and 416B represents the bottom surface. A heat sink may be attached to this bottom surface. The bottom surface of the support structure is 419B.

Figure 8:
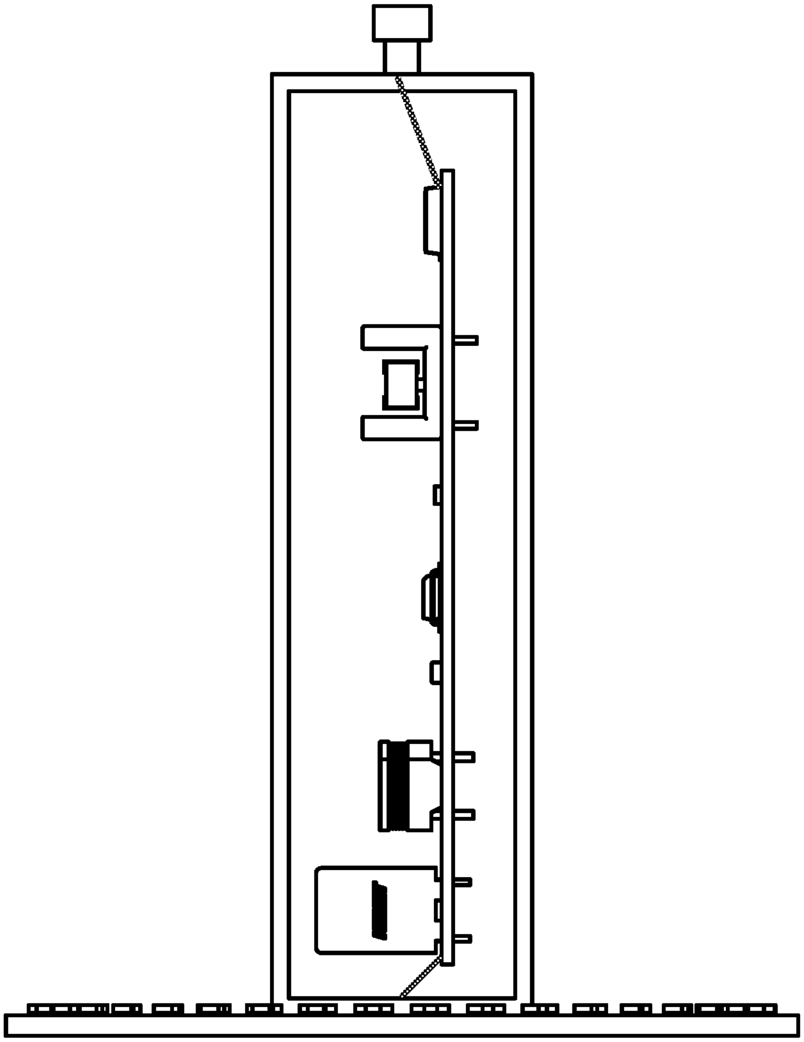
FIG. 8 is a side view of the embodiment of FIG. 4 showing internal arrangements.
Figure 9:
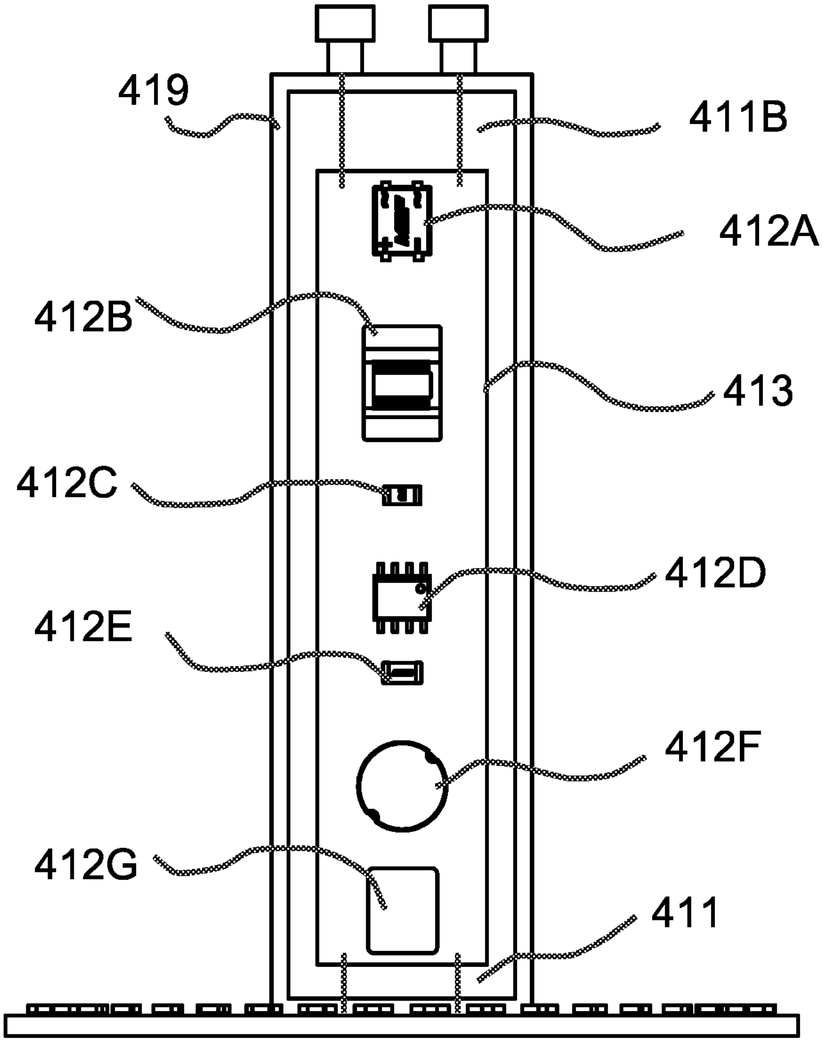
FIG. 9 is a front view of the embodiment of FIG. 4 showing internal arrangements.

FIG. 8 and FIG. 9 show the front and side views of the embodiment of FIG. 4 respectively, as if the support structure 419 were transparent, to show the arrangement of one embodiment of an LED driver. 411B represents input power connections to the driver that comprises a driver PCB 413. Electronic components earlier represented by 12 may comprise a bridge rectifier 412A, a common-mode choke 412B, a surface-mount capacitor 412C, a controller integrated circuit (IC) 412D, a surface mount resistor 412E, a through-hole drum-core inductor 412F, a film capacitor 412G and so on. 411 represents output connectors of the driver that supply power to the LEDs.

Figure 10:
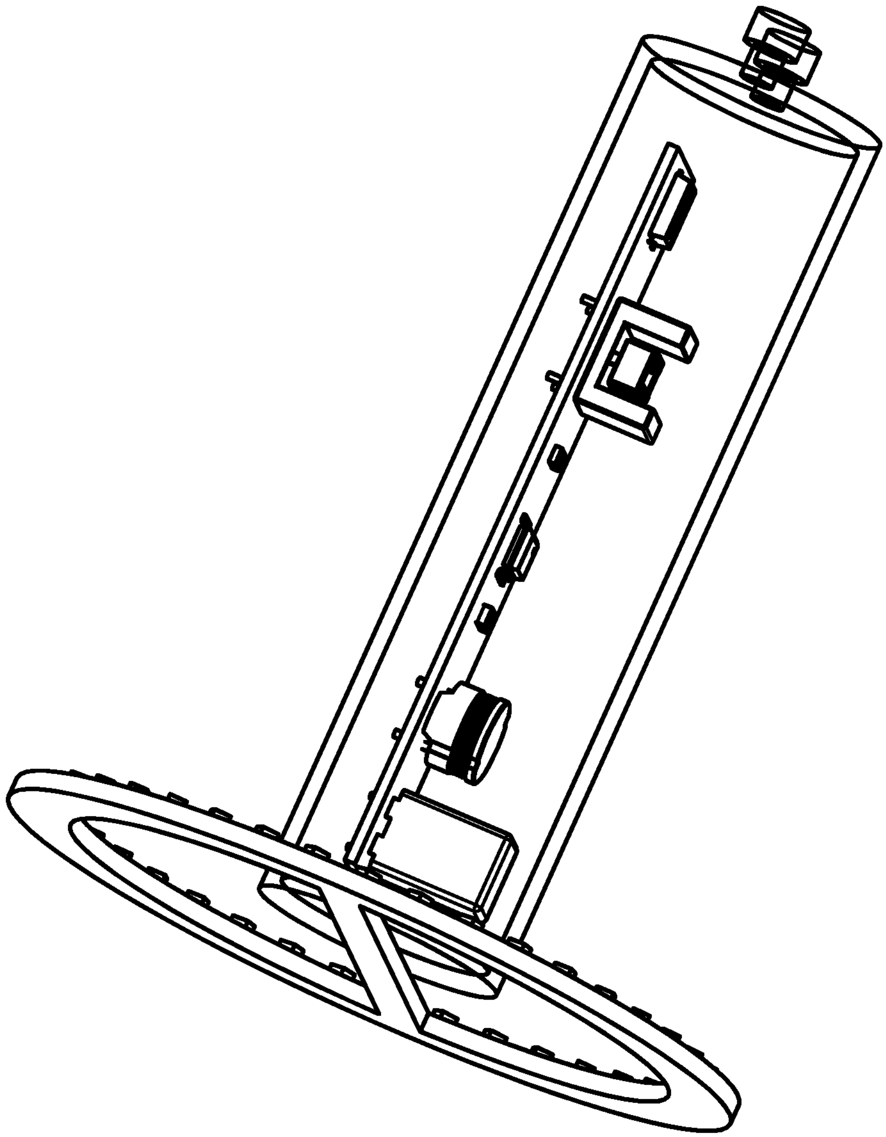
FIG. 10 is a less-detailed isometric view of the embodiment of FIG. 4 showing internal arrangements.

FIG. 10 shows an isometric view of the embodiment of FIG. 4 as if the support structure were transparent, however electrical connections 411 and 411B are not shown.

FIG. 11 shows an isometric view of just the LED substrate 116 with a couple of embodiments of the baffle scheme as described earlier in this application. 115A shows a baffle or barrier according to the present invention that is mounted at an angle to the LED substrate. 115B shows a baffle that is mounted perpendicular to the LED substrate and further has cooling fins shown by 115C. The novel aspect of this arrangement is that the baffle doubles as a heat sink for the LEDs 114 while primarily preventing direct light from the LEDs from going down below the horizontal plane of the LED substrate. In certain embodiments, the baffle 115A may be flexible and field adjustable. The baffles may be made of high reflective surfaces to maximize optical efficiency of the apparatus.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present inventive subject matter. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that when an element or layer is referred to as being "on" another element or layer, the element or layer can be directly on another element or layer or intervening elements or layers may also be present. In contrast, when an element is referred to as being "directly on" another element or layer, there are no intervening elements or layers present. As used herein, the term "and/or" includes any and all combinations of one or more of the associated listed items.

Spatially relative terms, such as "below", "beneath", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation, in addition to the orientation depicted in the figures. Throughout the specification, like reference numerals in the drawings denote like elements.

Embodiments of the inventive subject matter are described herein with reference to plan and perspective or isometric illustrations that are schematic illustrations of idealized embodiments of the inventive subject matter. As such, variations from the shapes of the illustrations as a result, for example, of manufacturing techniques and/or tolerances, are to be expected. Thus, the inventive subject matter should not be construed as limited to the particular shapes of objects illustrated herein, but should include deviations in shapes that result, for example, from manufacturing. Thus, the objects illustrated in the figures are schematic in nature and their shapes are not intended to illustrate the actual shape of a region of a device and are not intended to limit the scope of the inventive subject matter.

The terminology used herein is for the purpose of describing particular embodiments only and is not intended to be limiting of the present inventive subject matter. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present inventive subject matter belongs. It will be further understood that terms used herein should be interpreted as having a meaning that is consistent with their meaning in the context of this specification and the relevant art and will not be interpreted in an idealized or overly formal sense unless expressly so defined herein. The term "plurality" is used herein to refer to two or more of the referenced item.

It will be understood that, as used herein, the term light emitting diode may include a light emitting diode, laser diode and/or other semiconductor device which includes one or more semiconductor layers, which may include silicon, silicon carbide, gallium nitride and/or other semiconductor materials, a substrate which may include sapphire, silicon, silicon carbide and/or other microelectronic substrates, and one or more contact layers which may include metal and/or other conductive layers.

In the drawings and specification, there have been disclosed typical preferred embodiments of the inventive subject matter and, although specific terms are employed, they are used in a generic and descriptive sense only and not for purposes of limitation, the scope of the inventive subject matter being set forth in the following claims.

I claim:

1. A solid-state indirect lighting apparatus comprising:

means for electrical power transfer;

a substrate with at least an aperture and configured to mount a plurality of solid-state light emitters on one side thereof; and a tubular opaque support structure configured to support said substrate;

whereby, a portion of the light emitted by said solid-state light emitters directly passes through said aperture upon reflection from surfaces in proximity of said apparatus.

2. The apparatus of claim 1 wherein said means for electrical power transfer comprises wireless power transfer.

3. The apparatus of claim 1 wherein said support structure comprises high thermal conductivity material and is in thermal contact with said substrate.

4. The apparatus of claim 1 wherein said support structure is configured as a junction box.

5. The apparatus of claim 1 wherein a heat dissipating device is attached to said substrate.

6. The apparatus of claim 1 wherein the said support structure receives electrical power through a GU type connector.

7. The apparatus of claim 1 wherein said substrate is mounted with one or more baffles configured to keep said light on one side of the horizontal plane of said substrate.

8. The apparatus of claim 7 wherein said baffles have fins configured to cool said light emitters.

9. The apparatus of claim 1 wherein said support structure is configured to house driver electronics.

10. A system of electrically powered indirect illumination comprising:
- a space with a ceiling having a ceiling portion; and
- a solid-state lighting apparatus further comprising:
  - an opaque tubular structure configured to house driver circuitry and support a substrate; and
  - an aperture configured to pass direct reflected light from said ceiling portion through;
- said apparatus situated in a predetermined close proximity of said ceiling portion and further configured to cast majority of its light on to said ceiling portion;
- whereby, said space is illuminated by the reflection of said light from said ceiling.

11. The system of claim 10 wherein said ceiling portion has a reflectance of at least eighty percent.

12. The system of claim 10 wherein said proximity of said apparatus is automatically adjustable.

13. The system of claim 10 wherein said apparatus in its entirety is situated within ten inches from said ceiling portion.

14. The system of claim 10 wherein said apparatus casts more than half of its total light on to said ceiling portion within a circle of diameter of less than twelve inches.

15. The system of claim 12 wherein adjustment of said proximity is motorized.

16. The system of claim 10 wherein said electrical power is transmitted wirelessly from said junction box to said apparatus.

17. A method to illuminate a space comprising the steps of:
- (a) installing a solid-state indirect lighting apparatus, in its entirety, below and within ten inches of a ceiling of said space;
- (b) providing electrical power to said apparatus;
- (c) ensuring that a majority of light emitted by said apparatus is incident on said ceiling;
- (d) ensuring that a majority of said incident light is reflected towards said space; and
- (e) ensuring that a portion of said reflected light passes through said apparatus;
- whereby, said space is uniformly illuminated while reducing glare and increasing application efficiency.

18. The method of claim 17 wherein the reflected light is greater than ninety percent of said incident light.

19. The method of claim 17 wherein said electrical power is transferred wirelessly through said ceiling.

20. The method of claim 17 wherein a majority amount of said incident light falls within a circular shape of 20-inch diameter at most.

* * * * *